(12) United States Patent
Chesal et al.

(10) Patent No.: US 7,370,295 B1
(45) Date of Patent: May 6, 2008

(54) DIRECTED DESIGN SPACE EXPLORATION

(75) Inventors: Ian Chesal, Toronto (CA); Terry Borer, Toronto (CA)

(73) Assignee: Altera Corporation, San Jose, CA (US)

( * ) Notice: Subject to any disclaimer, the term of this patent is extended or adjusted under 35 U.S.C. 154(b) by 306 days.

(21) Appl. No.: 11/187,076

(22) Filed: Jul. 21, 2005

(51) Int. Cl.
*G06F 17/50* (2006.01)

(52) U.S. Cl. .......................... 716/2; 716/18

(58) Field of Classification Search ................ 716/1–3, 716/5, 18
See application file for complete search history.

(56) References Cited

U.S. PATENT DOCUMENTS

| | | | |
|---|---|---|---|
| 6,446,239 B1 * | 9/2002 | Markosian et al. ............ | 716/2 |
| 6,449,761 B1 * | 9/2002 | Greidinger et al. ........... | 716/11 |
| 7,181,703 B1 * | 2/2007 | Borer et al. .................. | 716/3 |

* cited by examiner

*Primary Examiner*—Vuthe Siek
(74) *Attorney, Agent, or Firm*—Townsend and Townsend and Crew, LLP (57) ABSTRACT

The time and computational resources needed to evaluate the potential input parameter settings in a design space is decreased by determining probabilities of improvement for input parameter settings in the design space and eliminating input parameter values that have low probabilities of improvement from the design space prior to compilation. The probability of improvement for input parameter settings is an estimate of the likelihood that the compilation of the user design using the set of input parameter settings will improve the performance of the user design with respect to one or more design goals, such as timing, power, or resource usage. The probability of improvement for input parameter settings can be determined from an analysis of the compilation results of sample designs, from attributes and/or constraints of the user design, and/or from a correlation between the results of optimization algorithms applied to the user design.

26 Claims, 6 Drawing Sheets

DIRECTED DESIGN SPACE EXPLORATION

CROSS-REFERENCES TO RELATED APPLICATIONS

This patent application is related to U.S. patent application Ser. No. 10/625,505, filed Jul. 23, 2003, and entitled "Techniques for Automated Sweeping of Parameters in Computer Aided Design to Achieve Optimal Performance and Resource Usage," and incorporates by reference the disclosure of this application herein for all purposes.

BACKGROUND OF THE INVENTION

The present invention relates to the field of programmable devices, and the systems and methods for programming the same. Programmable devices, such as FPGAs, typically includes thousands of programmable logic cells that use combinations of logic gates and/or look-up tables to perform a logic operation. Programmable devices also include a number of functional blocks having specialized logic devices adapted to specific logic operations, such as adders, multiply and accumulate circuits, phase-locked loops, and memory. The logic cells and functional blocks are interconnected with a configurable switching circuit. The configurable switching circuit selectively routes connections between the logic cells and functional blocks. By configuring the combination of logic cells, functional blocks, and the switching circuit, a programmable device can be adapted to perform virtually any type of information processing function.

A typical design cycle for determining the configuration of a programmable device, referred to as compilation, starts with an extraction phase, followed by a logic synthesis phase, a fitting phase, and an assembly phase. The extraction phase takes a user design, typically expressed as a netlist in a hardware description language such as Verilog or VHDL, and produces a set of logic gates implementing the user design. In the logic synthesis phase, the set of logic gates is permuted over the hardware architecture of the programmable device in order to match elements of the user design with corresponding portions of the programmable device. The fitting phase assigns the various portions of the user design to specific logic cells and functional blocks (sometimes referred to as placement) and determines the configuration of the configurable switching circuit used to route signals between these logic cells and functional blocks (sometimes referred to as routing), taking care to satisfy the user timing constraints as much as possible. In the assembly phase, a configuration file defining the programmable device configuration is created. The configuration can then be loaded into a programmable device to implement the user design. Programmable devices can be configured with the configuration file during or after manufacturing.

The compilation of a user design from a netlist to a configuration file is performed by one or more circuit compilation software applications. Quartus II, a product of the Altera Corporation, is an example of a prior art circuit compilation software application used to program programmable devices such as field programmable gate arrays (FPGAs), complex programmable logic devices (CPLDs), and structured ASICs.

To satisfy the design goals of a user design, the compilation software can apply one or more additional optimization algorithms to optimize the user design. Optimization algorithms can optimize a user design with respect to one or more of a number of different design goals, including overall execution speed, programmable device resource consumption, and power consumption.

Typically, compilation software includes a large number of different optimization algorithms that can be potentially applied to a user design. Input parameter settings select one or more of these optimization algorithms to be applied to a user design and specify the configurations of these selected optimization algorithms. Example input parameter settings may activate or modify the performance of optimization algorithms such as physical synthesis and register packing. Typically, compilation software includes default input parameter settings that are tailored to meet reasonable design goals for a representative sample of user designs. However, for any given user design, there may be alternative input parameter settings that provide better optimizations with respect to one or more design goals.

When users desire to maximize a design's performance with respect to one or more design goals, they may experiment with different input parameter settings. The Design Space Explorer is a prior software application provided by the Altera Corporation that assists users in determining input parameter settings tailored to a specific user design that provide better optimizations than the default input parameter settings. The Design Space Explorer compiles the user design multiple times with different randomly selected input parameter settings. For each compilation of the user design, the Design Space Explorer evaluates the performance of the user design configuration with respect to one or more design goals to determine which input parameter settings provide the best performance.

The Design Space Explorer is capable of evaluating all possible combinations of input parameter settings. As a result, the Design Space Explorer can find an optimal set of input parameter settings for any user design. However, this exhaustive search of all possible combinations of input parameter settings is often extremely time consuming and requires large amounts of computing resources. This discourages users from using the Design Space Explorer, especially when under a deadline. Additionally, the search time for the Design Space Explorer increases rapidly (often exponentially) as the number of input parameter settings increase. To decrease the search time of the Design Space Explorer, developers of circuit compilation software sometimes limit the number of input parameter settings by hard-coding the configuration settings of some optimization algorithms, rather than allowing users to specify the configuration of these optimization algorithms. Although this decreases the search time of the Design Space Explorer, it results in the hard-coded optimization phases performing sub-optimally for many user designs.

It is therefore desirable for a system and method to identify input parameter settings for user designs that provide better results than default input parameter settings without an exhaustive search of all possible combinations of input parameter settings.

BRIEF SUMMARY OF THE INVENTION

As discussed above, an exhaustive evaluation of all possible combinations is extremely time consuming. An embodiment of the invention decreases the time and computational resources needed to evaluate the input parameter settings in the design space by eliminating individual input parameter values and/or combinations of different input parameter values from the design space prior to compilation, thereby reducing the size of the design space and the time and computational effort required to evaluate the user design for the design space. An embodiment of the invention determines a probability of improvement for at least a portion of the sets of input parameter settings in the design space. The probability of improvement for a set of input parameter settings is an estimate of the likelihood that the compilation of the user design using the set of input parameter settings will improve the performance of the user design with respect to one or more design goals. Using the probability of improvement associated with a set of input parameter settings, an embodiment determines if the user design should be compiled and evaluated with these input parameter settings, or alternatively, if the compilation and evaluation of the user design with these input parameter settings should be skipped.

The probability of improvement for input parameter settings can be determined in a number of different ways. Generally, the probability of improvement is determined by correlating one or more input parameters with an estimate of the performance improvement with respect to one or more design goals for the user design. In embodiments of the invention, the probability of improvement for input parameter settings can be determined from an analysis of the compilation results of sample designs, from attributes and/or constraints of the user design, and/or from a correlation between the results of optimization algorithms applied to the user design.

BRIEF DESCRIPTION OF THE DRAWINGS

The invention will be described with reference to the drawings, in which.

DETAILED DESCRIPTION OF THE INVENTION

Figure 1:
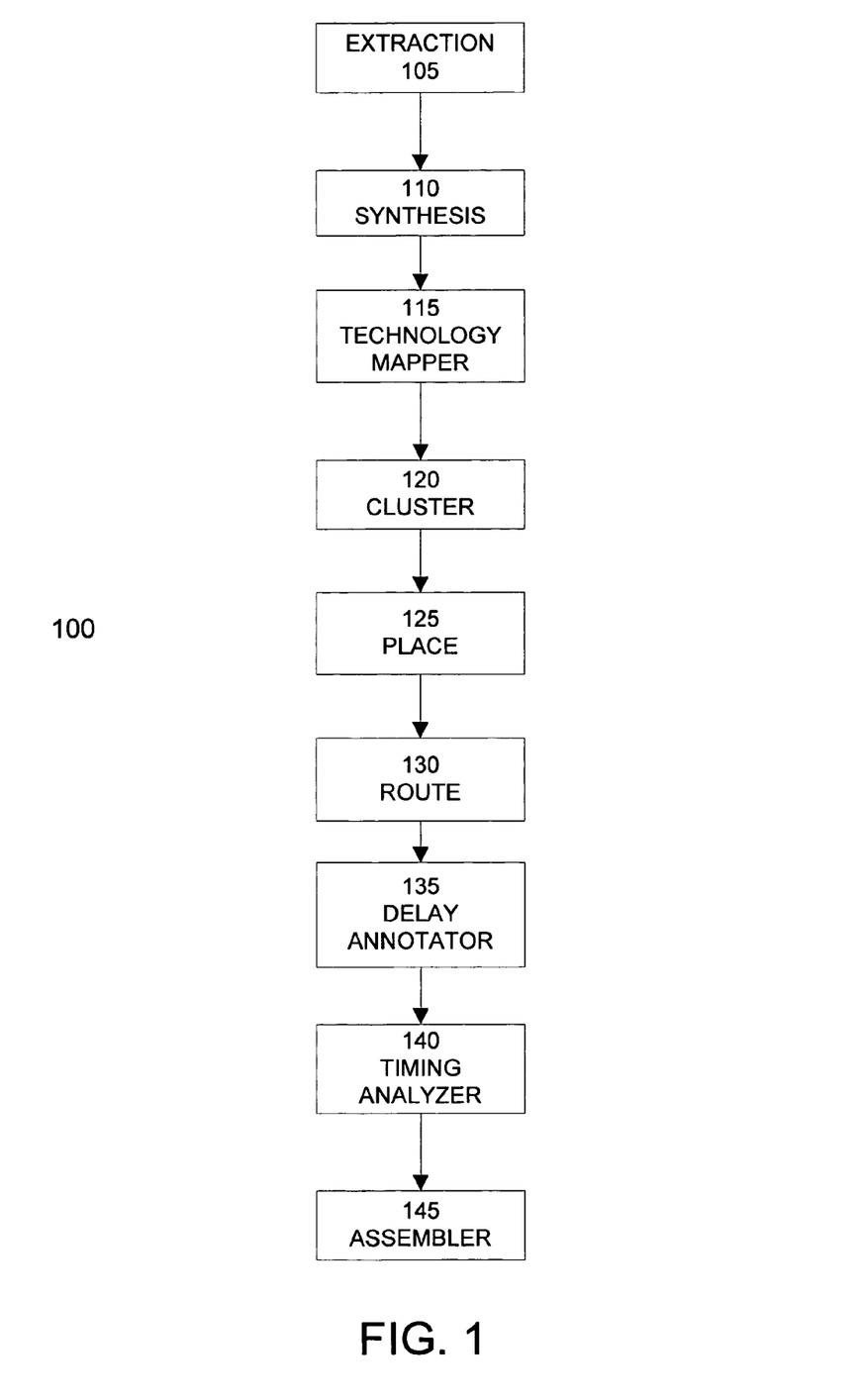
FIG. 1 illustrates the phases of a typical compilation process suitable for implementing an embodiment of the invention.

FIG. 1 illustrates the phases of a typical compilation process 100 suitable for implementing an embodiment of the invention. The compilation process 100 converts a user design into a programmable device configuration adapted to configure a programmable device to implement the user design. The extraction phase 105 converts a description of the user design, expressed for example in a hardware description language, into a register transfer layer description.

Synthesis phase 110 converts the register transfer layer description of the user design into a set of logic gates. Technology mapping phase 115 subdivides the set of logic gates into a set of atoms, which are groups of logic gates matching the capabilities of the logic cells or other functional blocks of the programmable device. A given user design may be converted into any number of different sets of atoms, depending upon the underlying hardware of the programmable device used to implement the user design.

Following the technology mapping phase 115, the cluster phase 120 groups related atoms together into clusters. The place phase 125 assigns clusters of atoms to locations on the programmable device. The route phase 130 determines the configuration of the configurable switching circuit of the programmable device used to connect the atoms implementing the user design.

The delay annotator phase 135 determines the signal delays for the set of atoms and their associated connections in the configurable switching circuit using a timing model of the programmable device. The timing analysis phase 140 determines the maximum operating speed of the programmable device when implementing the user design, for example by determining the portions of the user design have the largest signal delay.

The assembler phase 145 generates a set of configuration information specifying the configuration of the programmable device implementing the user design, including the configuration of each of the logic cells used to implement the user design and the configuration of the configurable switching circuit used to connect the logic cells. The assembler phase 145 can write the configuration information to a configuration file, which can then be used to configure one or more programmable devices to implement instances of the user design.

Figure 2:
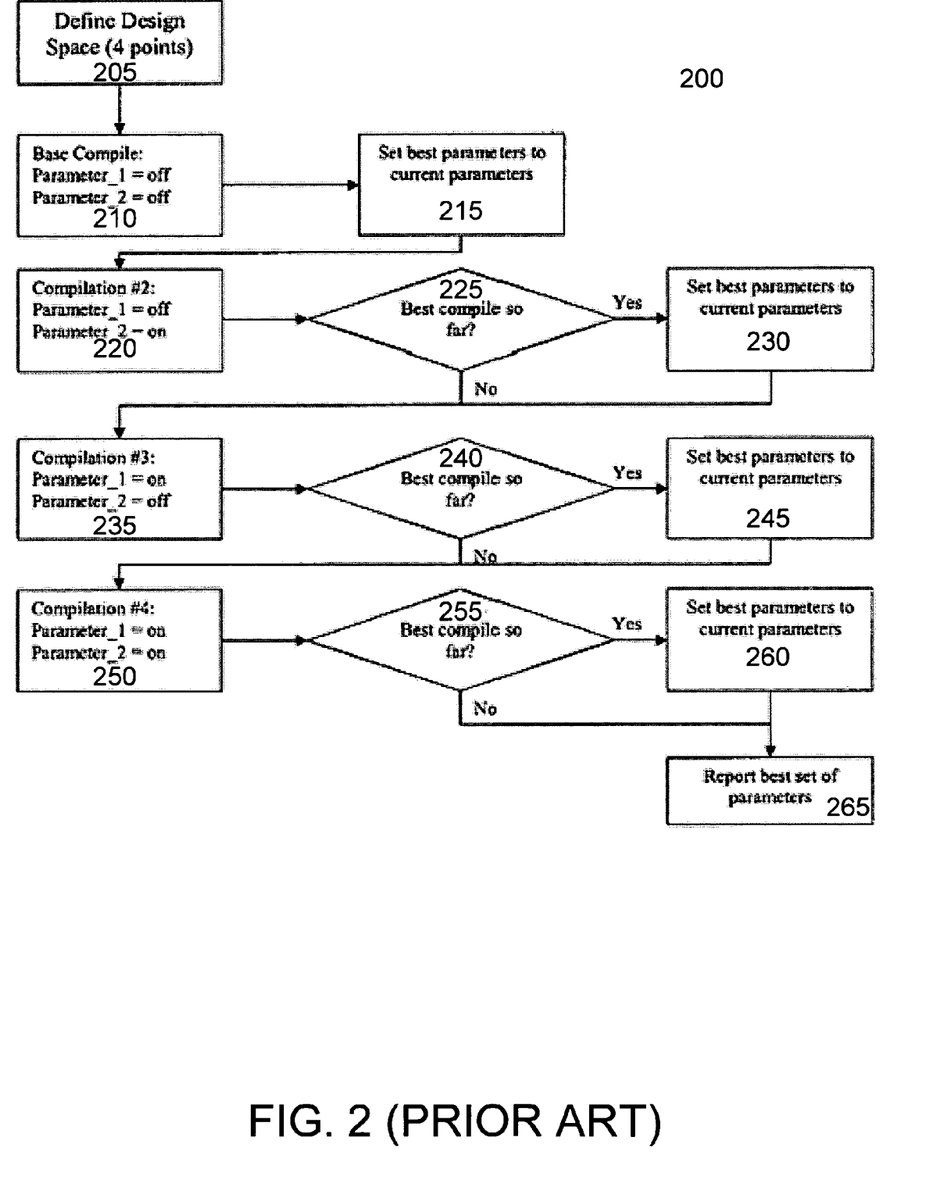
FIG. 2 illustrates a prior method of determining input parameter settings for a user design.

FIG. 2 illustrates a prior method 200 of determining input parameter settings for a user design. Step 205 defines a design space in which the user design is to be evaluated. A design space is the set of all possible combinations of input parameter settings that are being considered for compiling the user design. In the example of FIG. 2, there are two input parameters, each with two possible values. This example defines a design space of four possible input parameter settings. Input parameters can be defined having any number of possible values. For example, if a third input parameter having three possible values was added to the design space, then the design space would be increased to twelve possible input parameter settings.

Following step 205, method 200 begins the evaluation of all possible input parameter settings in the design space. In step 210, the user design is compiled using a first set of input parameter settings from the design space. Following compilation, the resulting configuration of the user design is evaluated with respect to one or more design goals. The design goals can be any aspect of the performance of the configuration of the user design.

Design goals can include timing or maximum operating speed, power consumption, and area or programmable device resource usage. A configuration can be evaluated with respect to a design goal using any type of performance metric known in the art, including the maximum speed of the configuration, the delay along the longest register-to-register path, the timing of input/output (I/O) signals, the number of logic cells, functional blocks, memories, arithmetic elements, or dedicated hardware used by the configuration of the user design for a programmable device, the minimal slack of one or more critical paths in the circuit, the number of paths which have negative (failing) slack values, or the number paths or other portions of the configuration of the user design failing a constraint.

Step 215 stores the first set of input parameter settings as the best input parameter settings and the results of the evaluation of the configuration of the user design. Following step 215, step 220 compiles the user design using a second set of input parameter settings from the design space.

Following compilation, the resulting configuration of the user design is evaluated with respect to one or more design goals.

Step 225 compares the results of the evaluation in step 220 with the results of the evaluation previously in associated with the best input parameter settings. If the results of the compilation in step 220 are better than the results associated with the best input parameter settings, step 230 stores the second set of input parameter settings as the best input parameter settings along with the results of the evaluation in step 220. Step 230 then proceeds to step 235. Alternatively, if the results of the compilation are not better than those associated with the previously stored best input parameter settings, step 225 proceeds directly to step 235.

Steps 235, 240, and 245 evaluate the compilation of the user design with a third set of input parameter settings in a similar manner as steps 220, 225, and 230. Similarly, steps 250, 255, and 260 evaluate the compilation of the user design with a fourth set of input parameter settings. In both cases, the best input parameter settings are updated if the results of a compilation are better than the results previously stored. Method 200 is illustrated with a design space having four possible sets of input parameter settings. For larger design spaces, additional steps similar to steps 220, 225, and 230 can performed to evaluate additional combinations of input parameter settings until all possible combinations of input parameter settings in the design space are evaluated. Following the evaluation of all possible combinations of input parameter settings in the design space, step 265 outputs the best set of input parameter settings.

As discussed above, an exhaustive evaluation of all possible combinations is extremely time consuming. An embodiment of the invention decreases the time and computational resources needed to evaluate the input parameter settings in the design space by eliminating individual input parameter values and/or combinations of different input parameter values from the design space prior to compilation, thereby reducing the size of the design space and the time and computational effort required to evaluate the user design for the design space. An embodiment of the invention determines a probability of improvement for at least a portion of the sets of input parameter settings in the design space. The probability of improvement for a set of input parameter settings is an estimate of the likelihood that the compilation of the user design using the set of input parameter settings will improve the performance of the user design with respect to one or more design goals. Using the probability of improvement associated with a set of input parameter settings, an embodiment determines if the user design should be compiled and evaluated with these input parameter settings, or alternatively, if the compilation and evaluation of the user design with these input parameter settings should be skipped.

The probability of improvement for input parameter settings can be determined in a number of different ways. Generally, the probability of improvement is determined by correlating one or more input parameters with an estimate of the performance improvement with respect to one or more design goals for the user design.

In an embodiment, the effect of input parameter settings on the compilation results of a representative sample of user designs is analyzed. The representative sample of user designs can be selected to encompass the types of applications implemented by typical users of programmable devices. The representative sample of user designs can be compiled with each possible set of input parameter settings and the resulting configurations analyzed. Input parameter settings or sets of input parameter settings providing improved performance for a large portion of the user designs, as compared with the results using default input parameter settings, can be assigned a high probability of improvement. Conversely, an input parameter setting or set of input parameter settings providing improved performance on a small portion of the representative sample of user designs is assigned a low probability of improvement.

In another embodiment, the resource usage or other attributes of a user design is correlated with the probability of improvement associated with sets of input parameter settings. For example, if certain optimization algorithms perform better on user designs having a relatively large number of components of a certain type, then this embodiment will determine the probability of improvement for input parameter settings associated with these optimization algorithms by determining the number of components of this type used by a given user design. In this embodiment, the correlation between resource usage and the probability of improvement can be positive or negative. For example, register re-timing algorithms are ineffective on user designs that do not have a large number of registers. Thus, for a given user design with no registers, the probability of improvement for input parameters associated with register re-timing algorithms is low.

User designs may include one or more constraints. In an embodiment, the constraints of a user design determine the probability of improvement for input parameter settings. For example, logic duplication algorithms use excess resources of a programmable device to improve the performance of a user design. However, if a given user design uses most or all of the available resources of a programmable device, there may not be a sufficient number of excess resources to effectively use a logic duplication algorithm.

In another embodiment, the performance of a group of optimization algorithms can be correlated to determine the probabilities of improvement for the group's respective input parameter settings. For example, if a second optimization algorithm often performs well when a first optimization algorithm performs well, then the probability of improvement for the input parameter settings associated with the second optimization algorithm can be based on the results of a first optimization algorithm.

In an example application of this embodiment, a first optimization algorithm is applied to the user design and the results are evaluated. Based on the results of this embodiment, the probabilities of improvement for input parameter settings associated with one or more additional optimization algorithms are determined. These probabilities of improvement are then used to determine which, if any, of the additional optimization algorithms should be evaluated and the associated input parameter settings are adjusted accordingly. The correlation between the results of different optimization algorithms can be positive or negative.

In additional embodiments, a correlation can be determined between optimization algorithms applied in the same compilation phase or in different compilation phases. For example, the results of a first optimization algorithm on a user design in the synthesis phase can determine the probability of improvement associated with a second optimization algorithm in the synthesis phase and/or a third optimization algorithm associated with a subsequent compilation phase, such as placement or routing.

In an embodiment, the probability of improvement for an input parameter setting or set of input parameter settings is directly proportional to the portion of the representative sample of user designs having improved performance from the input parameter setting or set of input parameter settings. In a further embodiment, the probability of improvement is determined using more sophisticated statistical analysis that accounts for both the portion of the representative sample of user design having improved performance and the magnitude of the improvement.

In an embodiment, this analysis can be performed in advance by the developers of the compilation software application for a large number of sample user designs, so that the compilation software application is provided to users with a set of preprogrammed probabilities of improvement for all of the possible input parameter settings in a design space. In a further embodiment, the compilation software includes a learning capability so that as users compile their own designs, the results of these user design compilations are used to adjust the probabilities of improvement associated with the sets of input parameter settings.

Figure 3:
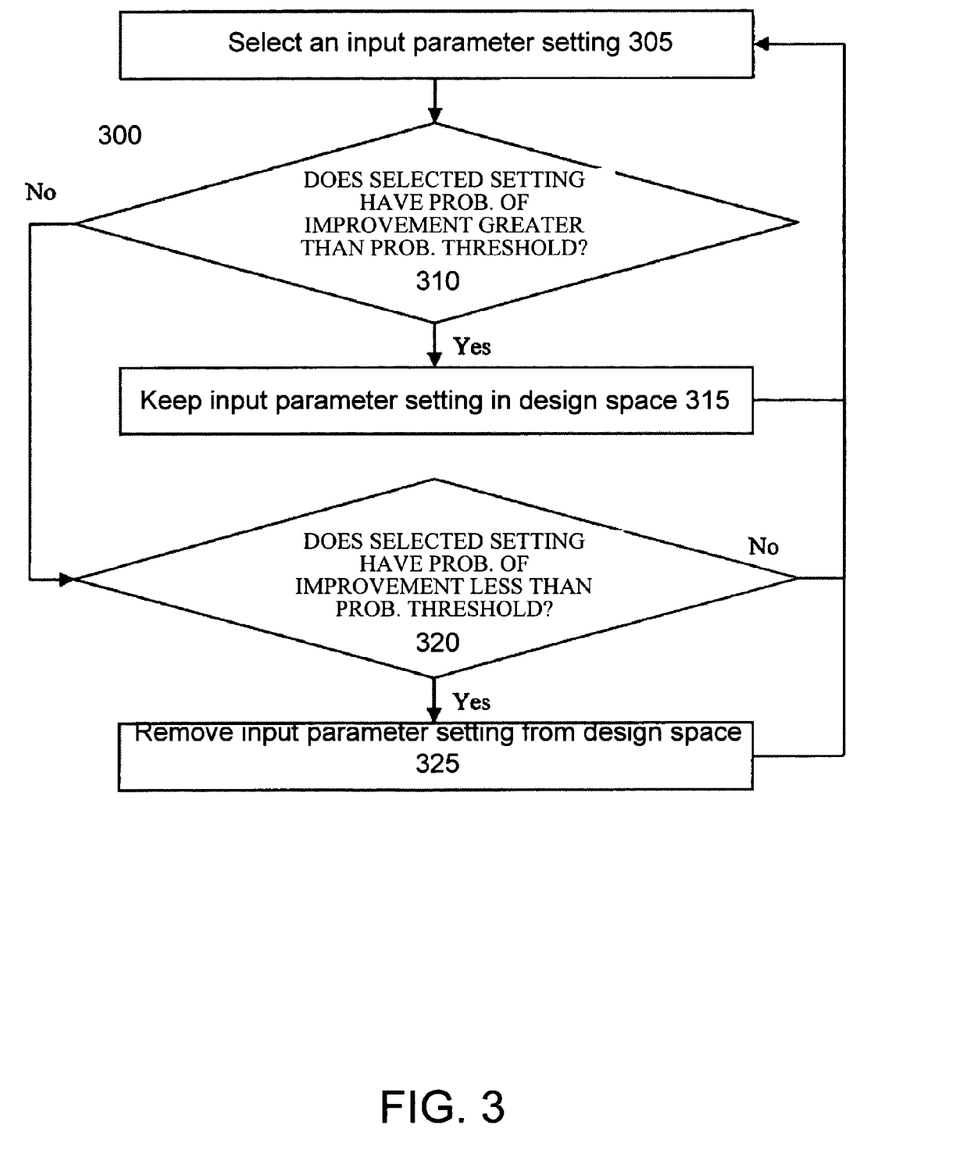
FIG. 3 illustrates a method of optimizing a design space prior to performing a design space search for a user design according to an embodiment of the invention.

FIG. 3 illustrates a method 300 of optimizing a design space prior to performing a design space search for a user design according to an embodiment of the invention. In an embodiment, method 300 performs an initial reduction in size of the design space for a user design. In an embodiment, method 300 can be prior to any compilations of the user design. At step 305, method 300 identifies an input parameter setting in the design space. In an embodiment, step 305 selects one of the input parameter settings from the set of all possible input parameter settings in the design space.

Step 310 compares the probability of improvement associated with the input parameter setting selected in step 305 with a probability threshold. The probability threshold is the minimum probability of improvement required for an input parameter setting to be used in a compilation of the user design. For example, if an input parameter setting has a probability of improvement of only five percent and the probability threshold is set at ten percent, the user design will not be evaluated with the input parameter setting during the design space search. Conversely, if the probability of improvement of an input parameter setting is greater than the probability threshold, the input parameter setting will be given further consideration in the design space search.

In an embodiment, the probability threshold is specified by the user and can be changed for any user design. By specifying a large probability threshold, the user can substantially reduce the size of the design space, thus greatly reducing the time and computing resources required to search for improved input parameter settings and still providing a high likelihood of obtaining some improvement in performance with respect to one or more design goals. By specifying a low probability threshold, the user can perform a more extensive search of the design space, which provides the chance for much greater improvements in performance. In an alternate embodiment, a default probability threshold value is provided.

Following step 310, if the probability of improvement for an input parameter setting exceeds the probability threshold, step 315 keeps the input parameter setting in the design space and returns to step 305, where another input parameter setting in the design space will be selected for evaluation.

Following step 310, if the probability of improvement for an input parameter setting does not exceed the probability threshold, step 320 determines if the input parameter setting has a probability of improvement lower than a second probability threshold value. The second threshold value is similar to the probability threshold discussed above, except it defines a lower bounds on the probabilities of improvement to be considered.

Following step 320, if the probability of improvement for an input parameter setting does not exceed the second probability threshold, step 325 removes the input parameter setting from the design space and returns to step 305. Alternatively, if the probability of improvement for an input parameter setting exceeds the second probability threshold, the input parameter setting is maintained in the design space for further consideration and method 300 returns to step 305 to select another input parameter setting in the design space.

Figure 4:
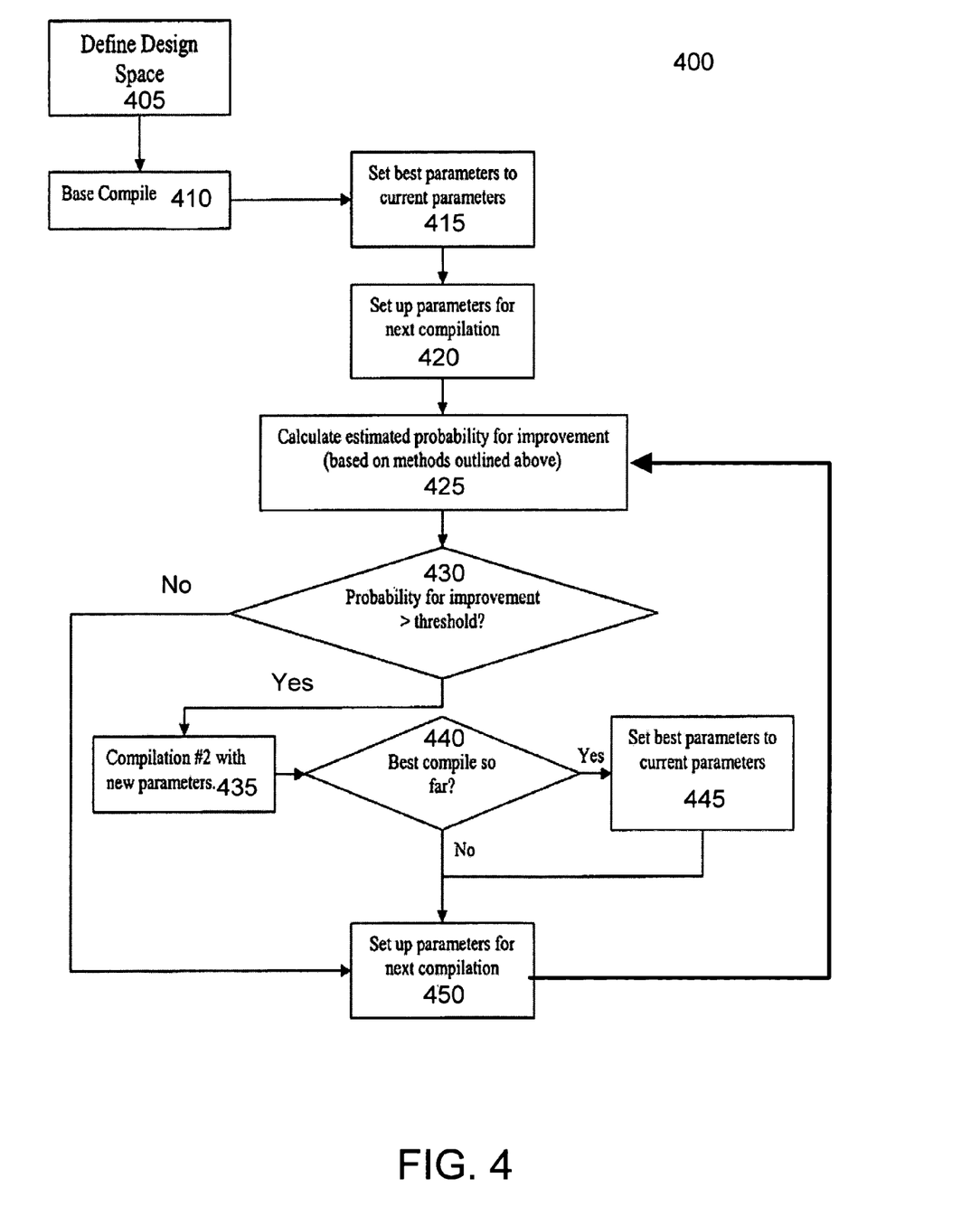
FIG. 4 illustrates a method of searching a design space according to an embodiment of the invention.

FIG. 4 illustrates a method 400 of searching a design space according to an embodiment of the invention. Step 405 defines a design space in which to evaluate a user design. In an embodiment, method 400 can be performed following an initial reduction of size of the design space, such as that described in method 300. In this embodiment, step 405 uses the design space resulting from method 300. In an alternate embodiment, method 300 can be bypassed and step 405 uses the original, full-size design space.

Step 410 performs an initial compilation of the user design using default input parameter settings and evaluates the performance of the resulting configuration. These performance results and default input parameter settings are stored as the best input parameter setting in step 415.

Step 420 selects another set of input parameter settings from the design space for evaluation of the user design. In an embodiment, input parameter settings can be selected randomly. In other embodiments, some input parameter settings can be selected before other input parameters in the design space, so as to take advantage of any correlation between the results of one set of input parameter settings with the probability of improvement of another set of input parameter settings.

Step 425 determines the probability of improvement for the selected set of input parameter settings, which can be determined as described above. In further embodiments, probabilities of improvement associated with individual input parameter settings can be combined to determine a combined probability of improvement for a set of input parameter settings. As discussed above, probabilities of improvement associated with input parameter settings can be predetermined for a representative sample of designs; stored in a table, array, database, or other data structure; and applied to the set of input parameter settings selected for a user design.

Step 430 compares the probability of improvement associated with the selected set of input parameter settings with a probability threshold. The probability threshold can be specified in a similar manner as that discussed above for method 300. If the probability of improvement is greater than the probability threshold, step 435 compiles the user design using the select set of input parameter settings and analyzes the performance of the resulting configuration with respect to one or more design goals.

Step 440 compares the results of step 435 with the previously stored best input parameter settings and associated performance results. If the results of step 435 are better than the previously stored results, step 445 stores the input parameter settings selected in step 420 and its associated results determined in step 435 as the best input parameter settings. Method 400 then proceeds to step 450.

Returning to step 430, if the probability of improvement associated with a selected set of input parameter settings is less than the probability threshold, method 400 proceeds to step 450. Similarly, if, in step 440, the results of step 435 using a selected set of input parameter settings is worse than the results stored in associated with the best input parameter settings, method 400 proceeds from step 440 directly to step 450.

Step 450 determines is there are any more sets of input parameter settings in the design space to be evaluated. If so, step 450 selects one of the remaining sets of input parameter settings in the design space and method 400 returns to step 425. Conversely, method 400 terminates and outputs the current best input parameter settings if there are no more sets of input parameter settings remaining in the design space. In a further embodiment, method 400 may also terminate and output the best input parameter settings if a user-specified time limit is reached, if a user-specified performance goal is reached with respect to one or more design goals, and/or if the user inputs a termination command. The best input parameter settings for a user design can be stored for future reference. The best input parameter settings can be retrieved and used to compile revisions of the user design. Reusing best input parameter settings for a revision of a user design typically provides satisfactory results when the revision of the user design is not substantial.

Figure 5:
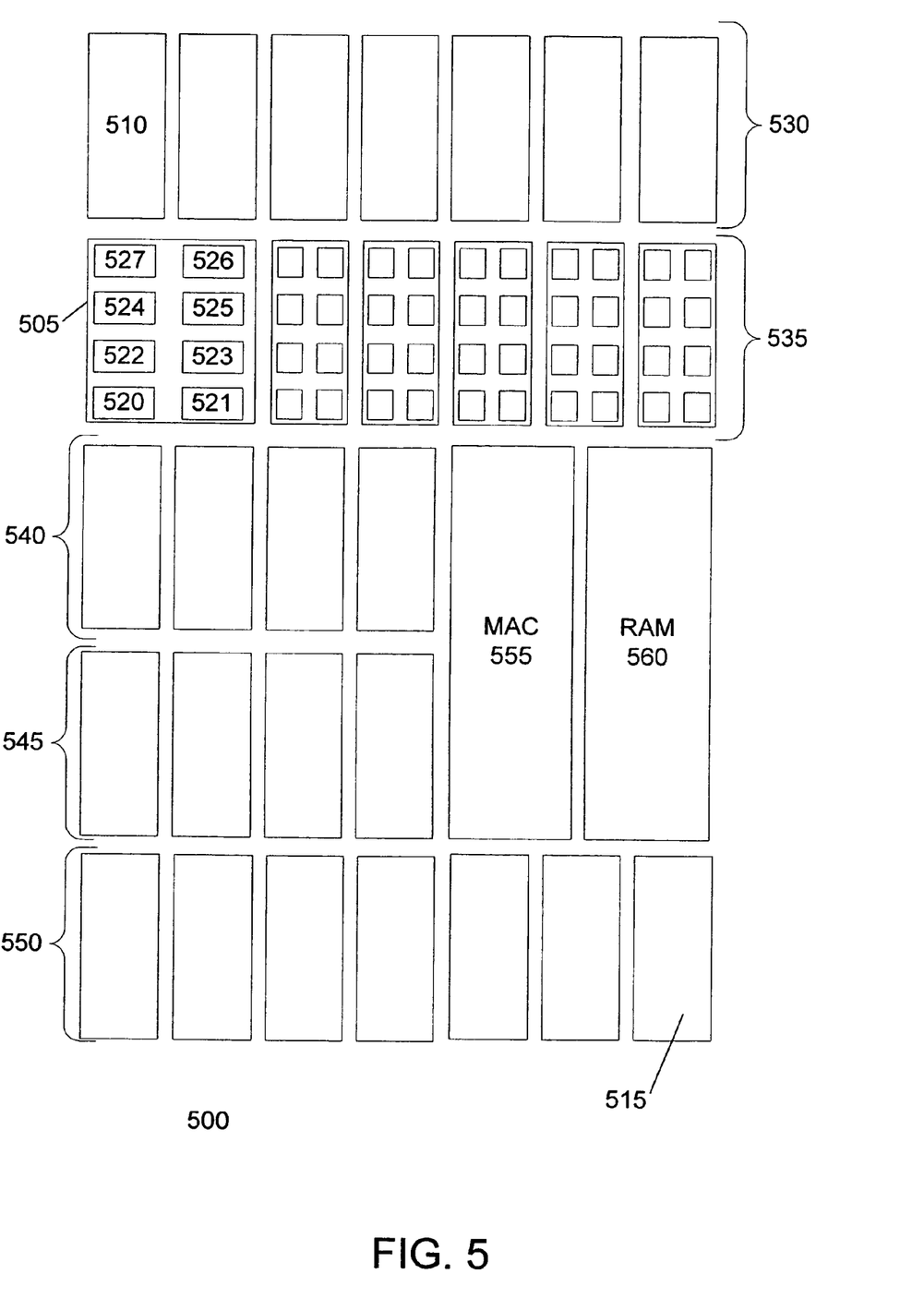
FIG. 5 illustrates a portion of an example programmable device suitable for use with an embodiment of the invention.

FIG. 5 illustrates a portion of an example programmable device 500 suitable for use with an embodiment of the invention. Programmable device 500 includes a number of logic array blocks (LABs), such as LABs 505, 510, 515. Each LAB includes a number of programmable logic cells using logic gates and/or look-up tables to perform a logic operation. LAB 505 illustrates in detail logic cells 520, 521, 522, 523, 524, 525, 526, and 527. Logic cells are omitted from other LABs in FIG. 5 for clarity. The LABs of device 500 are arranged into rows 530, 535, 540, 545, and 550. In an embodiment, the arrangement of logic cells within a LAB and of LABs within rows provides a hierarchical system of configurable connections, in which connections between logic cells within a LAB, between cells in different LABs in the same row, and between cell in LABs in different rows require progressively more resources and operate less efficiently.

In addition to logic cells arranged in LABs, programmable device 500 also include specialized functional blocks, such as multiply and accumulate block (MAC) 555 and random access memory block (RAM) 560. For clarity, the portion of the programmable device 500 shown in FIG. 5 only includes a small number of logic cells, LABs, and functional blocks. Typical programmable devices will include thousands or tens of thousands of these elements.

Figure 6:
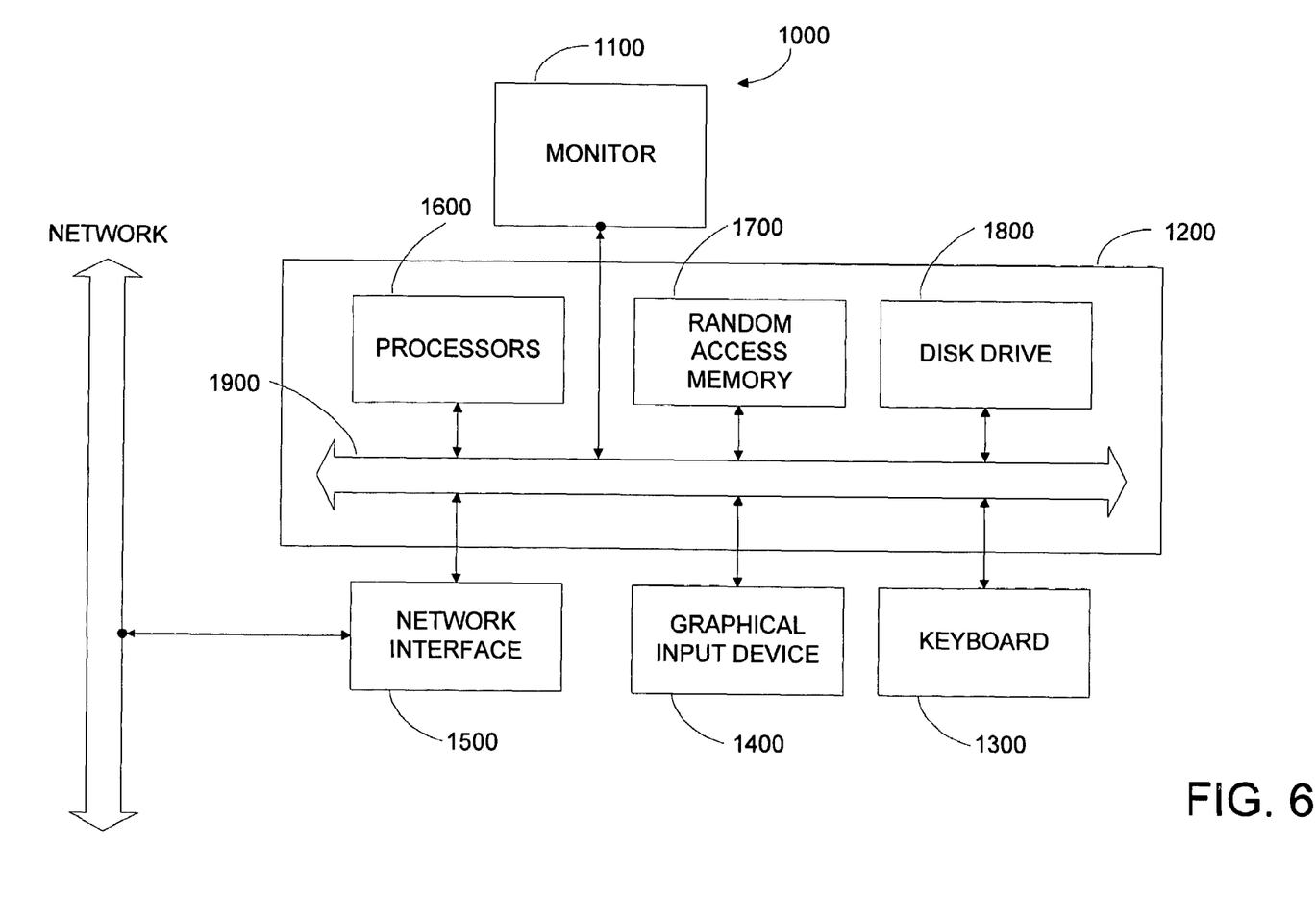
FIG. 6 illustrates an example computer system capable of implementing an embodiment of the invention.

FIG. 6 illustrates an example computer system 1000 capable of implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. For example, although the invention has been discussed with reference to programmable devices, it is equally applicable to logic minimization applications used to design any type of digital device, such as standard or structured ASICs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for compiling a user design for an integrated circuit, the method comprising:
    specifying a design space comprising input parameter settings;
    determining a probability of improvement with respect to at least one design goal for each input parameter setting of at least a first portion of the design space;
    selecting a second portion of the design space based on the probability of improvement associated with at least one input parameter setting of the design space;
    automatically performing multiple compilations of the user design using the input parameter settings of at least some of the second portion of the design space until a stopping criteria is reached;
    automatically evaluating the results of the multiple compilations of the user design with respect to at least one design goal to determine an optimal set of input parameter settings in the second portion of the design space; and
    reporting the optimal set of input parameter settings;
    wherein a first input parameter setting is associated with a first optimization algorithm and the probability of improvement for the first input parameter setting is determined from a correlation and results of a second optimization algorithm applied to the user design, wherein the correlation is determined from an evaluation of results of compilations of a set of sample designs with the first and second optimization algorithms.

2. The method of claim 1, wherein the optimal set of input parameter settings is stored for use with a future compilation of a revision of the user design.

3. The method of claim 1, wherein the probability of improvement for at least one input parameter setting is determined from an evaluation of results of compilations of a set of sample designs.

4. The method of claim 1, wherein the probability of improvement for at least one input parameter setting is determined from an evaluation of at least one attribute of the user design.

5. The method of claim 1, wherein the probability of improvement for at least one input parameter setting is determined from an evaluation of at least one constraint associated with the user design.

6. The method of claim 1, wherein the first and second optimization algorithms are adapted to be performed in a compilation phase.

7. The method of claim 1, wherein the first optimization algorithm is adapted to be performed in a first compilation phase and the second optimization algorithm is adapted to be performed in a second compilation phase, wherein the first compilation phase is adapted to process the user design subsequent to the second compilation phase.

8. The method of claim 1, wherein the correlation is a positive correlation between the results of compilations of the set of sample designs with the first and second optimization algorithms.

9. The method of claim 1, wherein the correlation is a negative correlation between the results of compilations of the set of sample designs with the first and second optimization algorithms.

10. The method of claim 1, wherein the stopping criteria includes receiving a command from a user.

11. The method of claim 1, wherein the stopping criteria includes the results of the compilation of the user design reaching a performance goal with respect to at least one design goal.

12. The method of claim 1, wherein the stopping criteria includes exceeding a time limit.

13. The method of claim 1, wherein the design goal includes a timing goal.

14. The method of claim 1, wherein the design goal includes a power consumption goal.

15. The method of claim 1, wherein the design goal include a device resource usage goal.

16. An information storage medium comprising a plurality of instructions adapted to direct an information processing device to perform an operation comprising:
specifying a design space comprising input parameter settings;
determining a probability of improvement with respect to at least one design goal for each input parameter setting of at least a first portion of the design space;
selecting a second portion of the design space based on the probability of improvement associated with at least one input parameter setting of the design space;
automatically performing multiple compilations of the user design using the input parameter settings of at least some of the second portion of the design space until a stopping criteria is reached;
automatically evaluating the results of the multiple compilations of the user design with respect to at least one design goal to determine an optimal set of input parameter settings in the second portion of the design space; and
reporting the optimal set of input parameter settings;
wherein a first input parameter setting is associated with a first optimization algorithm and the probability of improvement for the first input parameter setting is determined from a correlation and results of a second optimization algorithm applied to the user design, wherein the correlation is determined from an evaluation of results of compilations of a set of sample designs with the first and second optimization algorithms.

17. The information storage medium of claim 16, wherein the optimal set of input parameter settings is stored for use with a future compilation of a revision of the user design.

18. The information storage medium of claim 16, wherein the probability of improvement for at least one input parameter setting is determined from an evaluation of results of compilations of a set of sample designs.

19. The information storage medium of claim 16, wherein the probability of improvement for at least one input parameter setting is determined from an evaluation of at least one attribute of the user design.

20. The information storage medium of claim 16, wherein the probability of improvement for at least one input parameter setting is determined from an evaluation of at least one constraint associated with the user design.

21. The information storage medium of claim 16, wherein the stopping criteria includes receiving a command from a user.

22. The information storage medium of claim 16, wherein the stopping criteria includes the results of the compilation of the user design reaching a performance goal with respect to at least one design goal.

23. The information storage medium of claim 16, wherein the stopping criteria includes exceeding a time limit.

24. The information storage medium of claim 16, wherein the design goal includes a timing goal.

25. The information storage medium of claim 16, wherein the design goal includes a power consumption goal.

26. The information storage medium of claim 16, wherein the design goal include a device resource usage goal.

* * * * *